United States Patent [19]

Kimura et al.

[11] Patent Number: 4,950,849
[45] Date of Patent: Aug. 21, 1990

[54] CONTACT DETECTOR FOR MOVABLE OBJECTS

[75] Inventors: Kaoru Kimura; Shunji Sato; Masahiko Ookura, all of Kitakyushu, Japan

[73] Assignee: Kabushiki Kaisha Yaskawa Denki Seisakusho, Kitakyushu, Japan

[21] Appl. No.: 382,471

[22] Filed: Jul. 19, 1989

[30] Foreign Application Priority Data

Jul. 23, 1988 [JP] Japan .................................. 63-183875

[51] Int. Cl.⁵ ............................................... H01H 3/16
[52] U.S. Cl. .................................................. 200/61.41
[58] Field of Search ............... 200/61.34, 61.41, 61.42, 200/52 R, 6 B

[56] References Cited

U.S. PATENT DOCUMENTS 4,503,297 3/1985 Yagi et al. ......................... 200/61.39

OTHER PUBLICATIONS

IBM Technical Disclosure Bulletin, "Multiposition Z-Axis Actuator for Robot", vol. 29, No. 9, Feb. 1987, pp. 4168–4170.

Primary Examiner—J. R. Scott
Attorney, Agent, or Firm—Beveridge, DeGrandi & Weilacher

[57] ABSTRACT

A contact detector for movable objects comprises two opposite circular plates in which a plurality of cylindrical depressed portions are equidistantly opened on the same circumferences from a common center axis of the two circular plates, respectively, a plurality of steel balls, having a diameter larger than the diameter of each depressed portion, inserted into corresponding depressed portions of the two circular plates, and hardened layers formed on the portions in contact with the steel balls of the circular plates by pressurizing two circular plates from the opposite sides of respective depressed portions. A portion of the surface of each steel ball is depressed into each recessed portion, and the one circular plate and the steel balls are pressed into contact with the other circular plate by an elastic member. The contact detector further comprises a switch responsive to displacement of one of the two circular plates, and an arm adapted to be in contact with an external portion of a movable body, which is provided on the other circular plate.

16 Claims, 4 Drawing Sheets

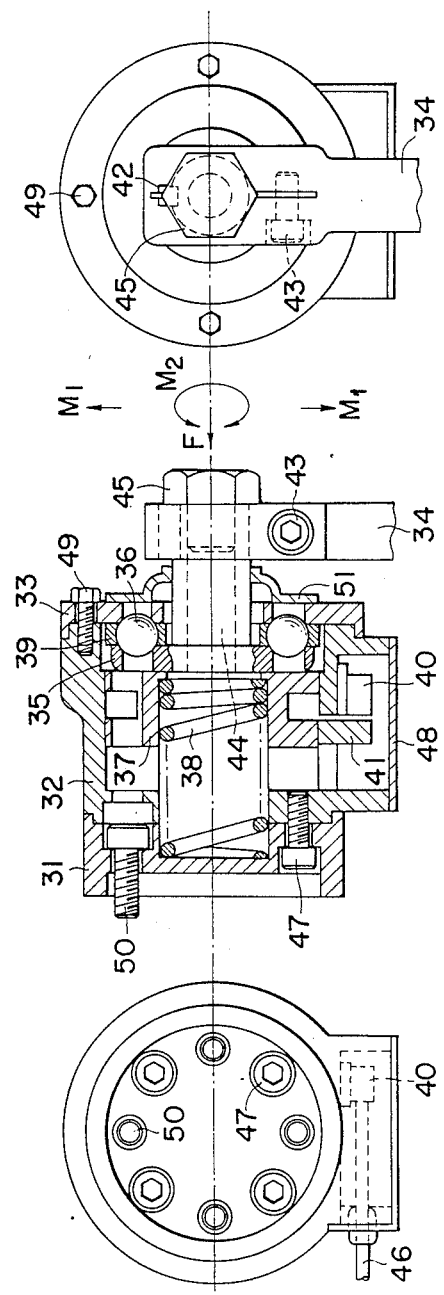

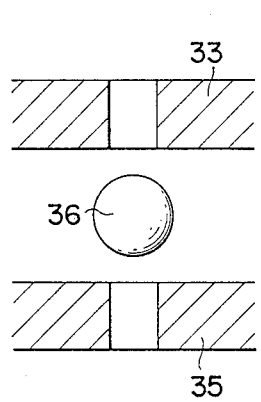
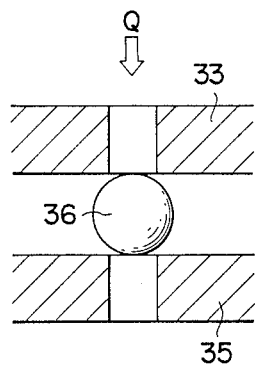
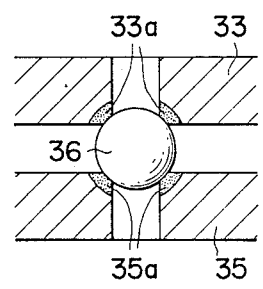
FIG. 2A    FIG. 2B    FIG. 2C
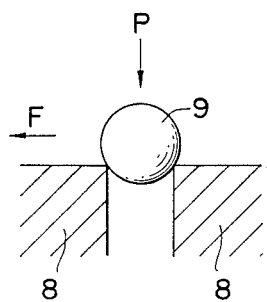
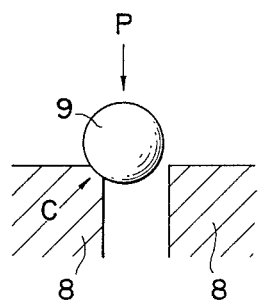
FIG. 5A
PRIOR ART
FIG. 5B
PRIOR ART

CONTACT DETECTOR FOR MOVABLE OBJECTS

TECHNICAL FIELD

This invention relates to a contact detector for movable objects wherein when a movable object comes into contact with a fixed body or fixture to undergo an external force, the contact detector detects this, thus to stop the operation of the movable object.

BACKGROUND ARTS AND THEIR PROBLEMS

In movable manufacturing machines, e.g., an industrial robot, etc., troubles due to contact with an external fixed body cannot be avoided by any means. It is the present stage that an approach is employed to detect such an unfavorable contact to stop the operation of the robot as soon as possible, thus to prevent the robot and the work from being damaged.

The appearance of a typical industrial robot using a weight body as a work is shown in FIG. 3 as the side elevational view.

As well known, this industrial robot designated by reference numeral 20 is provided with an arm 21, a swivel portion 22 connected to the arm 21, a gripper portion 24 connected to the swivel portion 22 through a contact detector 23 for movable object, and a spot gun 26 for work affixed to the gripper portion 24. Thus, this industrial robot carries out a welding work by making use of chips 27 provided on the spot gun 26.

FIGS. 4A–4C show a contact detector for a movable object, designated by reference numeral 23, which has been already proposed by the applicant (Japanese Utility Model Application Laid Open No. 61492/1987). A member 1 is affixed to a wrist flange of the robot by means of bolts 15. A member 2 is connected to the member 1 by means of bolts 14. These members 1 and 2 are affixed to the robot side. A member 3 for fitting a work is connected to the member 2 side. The attachment of the member 3 is carried out by assembling a spherical bearing 4 into the member 3, inserting a shaft 5 into the spherical bearing 4, thereafter inserting a resilient body 6 comprised of a coned disk spring into the portion between the shaft 5 and the member 2, and screw-connecting a nut 7 over the front end portion of the shaft 5. Bushes 8 are assembled into the member 2 on the robot side and the member 3 on the work side, respectively. Steel balls 9 are put between these bushes 8. In this instance, these steel balls 9 are held by a retainer 10 and put between the bushes 8. Attachment thereof is carried out by tightening or fastening the nut 7. Reference numeral 11 denotes a switch affixed to the member 1. This switch 11 is inserted into the shaft 5 and is set so that it is turned ON in response to detection of a displacement of the shaft 5. In this example, a bolt 12 for adjustment of operating distance is opposite to the front end surface of the switch 11. In this figure, reference numeral 11a is a nut for fixing the switch 11 serving as a double nut, reference numeral 11b is a lead wire for the switch 11, reference numeral 11c is a hole for penetrating the lead wire 11b therethrough, and reference numeral 12a is a coned disk spring for preventing loosening of the bolt 12 for adjustment.

The operation of the arrangement stated above will be described.

When a moment $M_1$ in a direction indicated by an arrow is applied to the member 3, the member 3 raises the other shoulder thereof against the coned disk spring 6 using a steel ball 9 as a point of support. Thus, the shaft 5 is concurrently subjected to displacement. As a result, the contact of the switch 11 is opened, whereby an ON signal is output.

When a torsional external force $M_2$ is applied, a steel ball 9 slips out of bushes 8 provided in the members 2. Similarly, the shaft 5 is subjected to displacement in a direction of opening the switch 11. Thus, an ON signal is output from the switch 11.

When tensile forces f and F are applied, an operation similar to the above is performed. Namely, the member 3 raises the other shoulder thereof against the coned disk spring 6 using a steel ball 9 as a point of support, thus allowing the shaft 5 to be subjected to displacement in a direction of opening the switch 11. As a result, an ON signal is output.

As just described above, in accordance with this detector, when an external force is applied to the work side member 3, a signal indicative of contact with an external fixed body is output from the switch 11. By employing a device to stop a robot using this signal, damages due to contact trouble of robot can be prevented.

This contact detector is of a structure such that it is automatically returned to a normal state when a contact object is removed. In addition, since reproducibility is ensured, restration can be made in a short time.

However, with such a conventional detector, when an external force is exerted on steel balls 9 between bushes 8, there is the possibility that the contact surface of the bush 8 may be deformed because of the hardness of the bush 8 is low. FIGS. 5A and 5B show the case that a torsional external force $M_2$ is exerted on the member 3. A pressing force P by the resilient body 6 is exerted on the steel ball 9 (FIG. 5A). When an external force $M_2$ is exerted in this state, the steel ball 9 attempts to ride on the shoulder portion of the bush 8 (bush on the lift side in the figure) of the robot side member 2 to firmly come into contact therewith. By this contact, there is produced a deformation C such that the contact surface of the bush 8 becomes depressed (FIG. 5B). Since detection accuracy initially set varies by such a deformation C, it is impossible to permanently maintain the detection accuracy. Furthermore, steel balls 9 are simply put between bushes 8 and held therebetween. For this reason, a clearance is apt to occur between steel balls 9 and bushes 8. The positioning accuracy at the working front end of the robot is lowered by this clearance.

SUMMARY OF THE INVENTION

Object

With the above in view, an object of this invention is to provide a contact detector for movable objects, which is free from deformation and/or clearance by steel balls, and which is operable with a high accuracy for a long time.

TECHNICAL MEANS FOR SOLVING PROBLEMS

In this invention, an approach is employed to apply a pressure to steel balls put between two members using a press, etc. so that they are fitted therebetween. For this reason, a contact detector for movable objects according to this invention comprises a plurality of steel balls put between two members and fitted into depressed portions formed by applying a pressure to the two members, a resilient body forcing one member and the steel balls to come into contact with the other member, and a switch operative when one member or the steel ball is subjected to displacement relative to the other member.

Since this invention is constituted as stated above, when a pressing force is exerted, from the two members, on the steel balls put between these two members, the portions in contact with the steel balls of the two members become depressed and hardened layers are formed at the same time. Thus, the steel balls are fitted into the depressed portions of the hardened layers, and tightly held with no clearance between the steel balls and the members. In addition, even if steel balls are relatively subjected to displacement so that they firmly come into contact with the members, there is no possibility that these members are deformed.

BRIEF DESCRIPTION OF THE DRAWINGS

FIG. 1 shows an embodiment according to this invention wherein FIG. 1A is a bottom view, FIG. 1B is a side cross sectional view, and FIG. 1C is a top view.

FIG. 2 is a cross sectional view showing means for forming hardened layers on the member 33 and the shaft 35.

FIG. 5A is a cross sectional view showing a non-deformed state of a steel ball supporting depression shown in FIGS. 4A-4C.

FIG. 5B is a cross-sectional view showing a depression in deformed state.

DESCRIPTION OF THE PREFERRED EMBODIMENT

Figure 3:
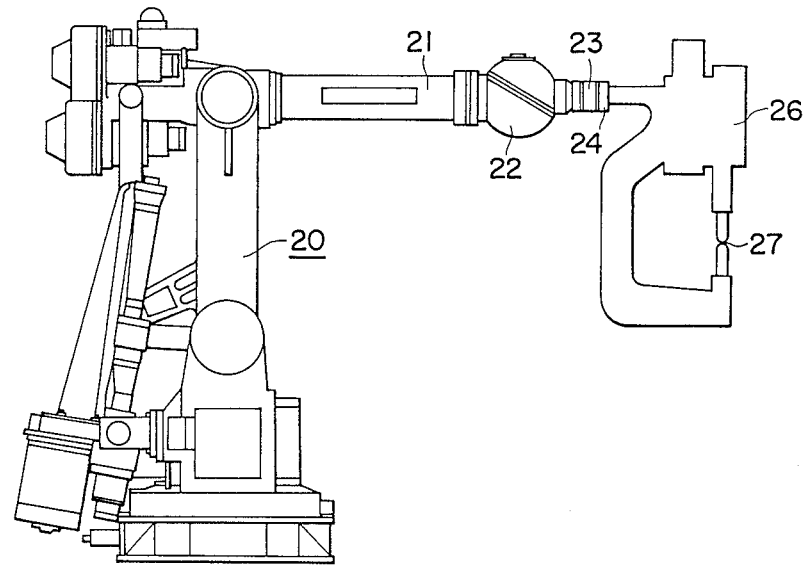
FIG. 3 is a cross sectional view of an industrial robot.
Figures 4A, 4B, 4C:
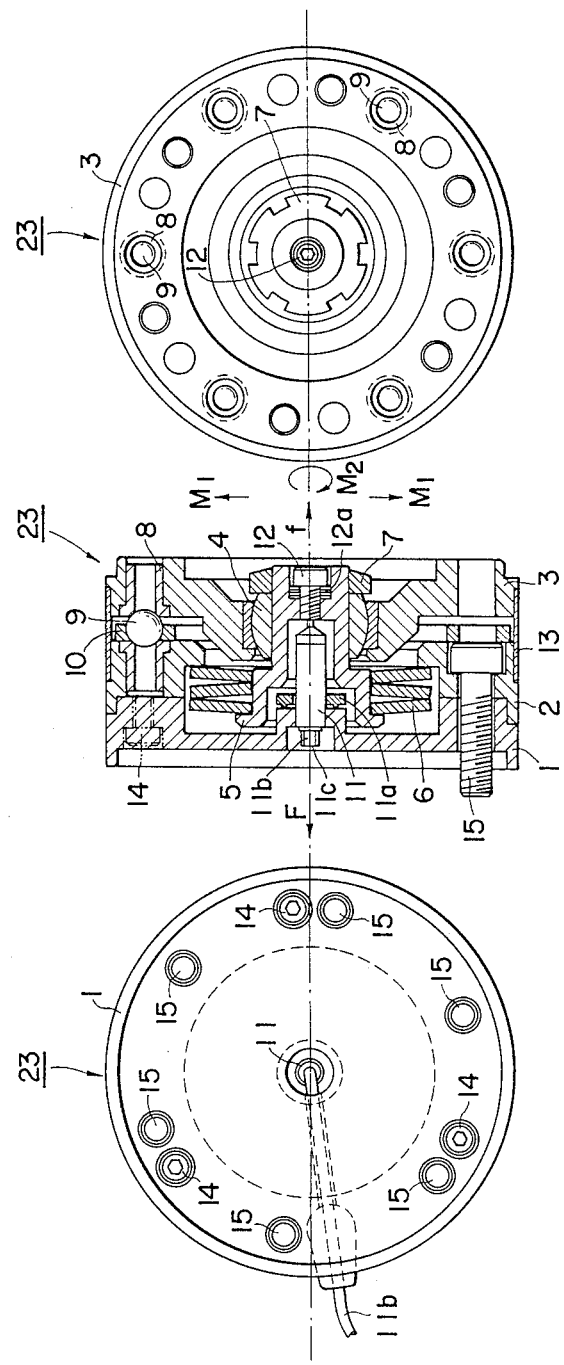
FIG. 4A is a bottom view of a prior art contact detector
FIG. 4B is a side cross sectional view of the prior art contact detector and FIG. 4C is a top view of the prior art contact detector.

The structure of an embodiment according to this invention is shown in FIG. 1.

FIG. 1A is a bottom view when viewed from the robot side, FIG. 1B is a side cross sectional view, and FIG. 1C is a top view when viewed from the work side. The structure on the robot side is composed of a member 31 affixed to a wrist flange of the robot by means of bolts 50, a member 32 affixed to the member 31 by means of bolts 47, a member 33 affixed to the work side of the member 32 by means of bolts 49, a cover 48 covering a portion of the member 32, and a cover 51 covering a portion of the end portion in the axial direction of the member 33. On the other hand, the structure on the work side is composed of an arm 34 to which a work is affixed, and a shaft 35 to which the arm 34 is affixed. In this embodiment, the arm 34 is subjected to positioning by a key 42 and is affixed to the shaft 35 by tightening the bolts 43. Further, the shaft 35 is provided with a cavity portion 44 formed in the axial direction thereof. By screw-connecting bolts 45 into the cavity portion 44, closing of the cavity portion 44 is carried out.

In the embodiment thus constructed, the member 33 constituting a portion of the structure on the robot side and the shaft 35 constituting a portion of the structure on the work side constitute opposite two members. A plurality of steel balls 36 are fitted into the portion between these members 33 and 35. Moreover, a tubular guide 37 displaceable in three dimensional directions is provided within the member 32 so that it is in contact with the shaft 35. In addition, a resilient body 38 comprised of a coil spring is inserted into the portion between the guide 37 and the member 31. In this structure, the resilient body 38 is adapted to press the shaft 35 and the steel balls 36 through the guide in the direction of the member 33. When the shaft 35 is subjected to displacement against this pressing force, the guide 37 will be subjected to displacement by the same displacement quantity as that of the shaft 35 in the same direction. A dog 41 is affixed to the guide 37, and a switch 40 is affixed to the member 32 so that it is opposite to the dog 41. The switch 40 is set so that it is turned ON in response to detection of displacement of the dog 41, i.e. displacement of the shaft 35. In the figure, reference numeral 39 denotes a retainer for holding steel balls 36 down between the shaft 35 and 33, and reference numeral 46 denotes a lead wire drawn from the switch 40.

In the structure stated above, steel balls 36 are put between the shaft 35 and the member 33. By applying a pressure to either of the shaft 35 and the member 33 between which steel balls 36 are put, steel balls 36 are fitted into the portion between the shaft 35 and the member 33. FIGS. 2A-2C show a process carrying out the above-mentioned work. Initially, a steel ball is set between the shaft 35 and the member 33 (FIG. 2A), and they are put therebetween. When a pressure is applied to the member 33 using a pressurizing device (FIG. 2B), the portion in contact with the steel ball of the member 33 and the shaft 35 becomes depressed by the pressure force Q. As a result, steel ball 36 is fitted into these depressed portions. Such a pressurization is carried out by a so-called cold forging. By this pressurization, hardened layers 33a and 35a are formed at the portions in contact with the steel balls 36 of the member 33 and the shaft 35. Because these hardened layers 33a and 35a have a high hardness, even if the steel ball 36 is fixedly in contact with these hardened layers by displacement such as riding-on, there is no possibility that the shaft 35 and the member 33 are deformed. Accordingly, the detection accuracy initially set can be maintained and detection can be made with a permanent accuracy. Further, the steel balls 36 and the hardened layers 33a and 35a are securely and tightly in contact with each other, resulting in no occurrence of clearance therebetween. Thus, high accuracy positioning can be carried out.

The operation of the contact detector according to this invention will now be described.

When a moment $M_1$ is applied to the shaft 35, the shaft 35 raises the other shoulder portion of the shaft 35 against the resilient body 38 using the steel ball 36 as a support point. As a result, the guide 37 is also subjected to displacement in synchronism with the displacement of the shaft 35. Thus, the switch 40 becomes operative. When a torsional external forth $M_2$ is applied, the steel ball 36 slips out of the member 33 or the shaft 35. As a result, the guide 37 is subjected to displacement. Thus, the switch 40 becomes operative. When a compression force F is applied, the guide 37 is similarly subjected to displacement against the pressure force by the resilient body 38. As a result, the switch 40 becomes operative. Accordingly, detection of an external force is securely made, so damage such as a contact trouble can be prevented. In addition, since the portions in contact with the steel balls 36 of the shaft 35 and the member 33 are formed as hardened layers, respectively, the shaft 35 and the member 33 are not deformed. Thus, high accuracy detection can be permanently maintained.

As described above, the contact detector for movable objects according to this invention is of a structure to pressurize steel balls put between two members to thereby fit them into the space between these two members, wherein hardened layers are formed on respective two members. Accordingly, two members undergo no displacement, and the detection accuracy can be maintained. In addition, since the two members and the steel balls are tightly in contact with each other, resulting in occurrence of no clearance. Thus, positioning accuracy is also improved.

We claim:

1. A contact detector for movable objects, comprising:
   a first member having a first surface;
   a second member having a second surface in opposing relationship with said first surface, said first and second surfaces including depressions arranged so as to form opposing pairs of depressions;
   spherical balls positioned between an opposing pair of depressions, and said depressions including a contact surface which conforms to the curvature of said spherical balls, said contact surfaces being formed by placing said spherical balls, which have a diameter larger than that of said depressions and a hardness higher than that of said members, between said members and by applying a pressurizing force to compress said spherical balls positioned between said members such that said contact surfaces are formed due to the spherical surface of said spherical balls being imparted to said depressions;
   biasing means for producing a biasing force smaller than said pressurizing force, but sufficient to hold said spherical balls between said opposing pairs of depressions and to bias one of the two members toward the other;
   support means for supporting said biasing means in position with respect to said members; and
   switching means operative upon movement of one member with respect to the other member, and said switching means having a first part in fixed relationship with respect to said support means and a second part which moves relative to said first part upon movement of said one member with respect to the other member.

2. A contact detector for movable objects as set forth in claim 1, wherein said contact surfaces include a hardened layer.

3. A contact detector for movable objects according to claim 1, wherein said depressions formed on said surfaces in opposing relationship are positioned along the same circumference and at an equal pitch.

4. A contact detector for movable objects according to claim 1, wherein one of said two members is connected to an arm of an industrial robot, while the other of said two members is connected to work holding means.

5. A contact detector for movable objects according to claim 1, further comprising retainers which are provided between said two members for holding said steel balls between respective ones of said opposing pairs of said depressions.

6. A contact detector for movable objects comprising:
   a first member with a first planar surface and a guide contact surface, said first member including a shaft extending outwardly away from said first planar surface, and a plurality of depressions formed in said first planar surface;
   a housing having a second member fixedly secured thereto, and said second member having a second planar surface and an aperture formed therein through which said shaft extends, and said second planar surface having a plurality of depressions formed therein;
   a plurality of spherical balls, and said depressions formed in said first planar surface and said depressions formed in said second planar surface being arranged in opposing pairs so as to provide a retention space for retaining said spherical balls in position between said first and second planar surfaces;
   a guide member;
   biasing means for biasing said guide member into contact with the guide contact surface of said first member and for biasing said first planar surface towards said second planar surface so as to compress said spherical balls within said retention spaces defined by the opposing pairs of depressions; and
   a switching device,
   said switching device being activated upon either an axial force being applied along a central axis of said shaft, a torsional force being applied to said shaft or upon a moment being applied about an axis transverse to the central axis of said shaft.

7. A contact detector as recited in claim 6, further comprising retainer members surrounding said spherical balls and positioned between said first and second planar surfaces.

8. A contact detector as recited in claim 6, wherein said depressions include an outer edge on the same plane as a respective one of said first and second planar surfaces, and each of said depressions includes a predeformed contact surface extending inwardly from said outer edge into said depression and having a contact surface with a radius of curvature essentially equal to that of said spherical balls.

9. A contact detector as recited in claim 8, wherein said spherical balls are formed of a material harder than said first and second members and said contact surface includes a layer of hardened material formed by compressing said spherical balls between said first and second members until an initial outer edge of said depression is transformed outwardly and said contact surface is formed.

10. A contact detector as recited in claim 9, wherein said hardened layer is formed by a cold forging process.

11. A contact detector as recited in claim 1, wherein said depressions include an outer edge on the same plane as a respective one of said first and second planar surfaces, and said contact detector is dimensioned an arranged such that said spherical balls are free to travel, during operation of said contact detector out away from the center of said depressions and into contact with said outer edge of said depressions upon a torsional force being applied to said shaft.

12. A contact detector for movable objects, comprising:
   a first member with a first planar surface and a guide contact surface, said first member including a shaft extending outwardly away from said first planar surface, and a plurality of depressions formed in said first planar surface;
   a housing having a second member fixedly secured thereto, and said second member having a second planar surface and an aperture formed therein through which said shaft extends, and said second planar surface having a plurality of depressions formed therein;

a plurality of spherical balls, and said depressions formed in said first planar surface and said depressions formed in said second planar surface being arranged in opposing pairs so as to provide a retention space for retaining said spherical balls in position between said first and second planar surfaces;

a guide member;

biasing means for biasing said guide member into contact with the guide contact surface of said first member and for biasing said first planar surface towards said second planar surface so as to compress said spherical balls within said retention spaces defined by the opposing pairs of depressions; and a switch actuating member secured to said guide member;

a switch means affixed to said housing; and said depressions including a n outer edge on the same plane as a respective one of said first and second planar surfaces, and said contact detector being dimensioned and arranged such that, upon operation of said contact detectors, said spherical balls are free to travel out away from the center of said depressions and into contact with said outer edge of said depressions upon a torsional force being applied to said shaft.

13. A contact detector as recited in 12, further comprising retainer members surrounding said spherical balls and positioned between said first and second planar surfaces.

14. A contact detector as recited in claim 12, wherein each of said depressions includes a pre-deformed contact surface extending inwardly from said outer edge into said depression and said contact surface having a radius of curvature essentially equal to that of said spherical balls.

15. A contact detector as recited in claim 14, wherein said spherical balls are formed of a material harder than said first and second members and said contact surfaces include a layer of hardened material formed by compressing said spherical balls between said first and second members until an initial outer edge of said depression is transformed outwardly and said contact surface is formed.

16. A contact detector as recited in claim 15, wherein said hardened layer is formed by a cold forging process.

* * * * *